(12) United States Patent
Hsieh et al.

(10) Patent No.: US 8,072,403 B2
(45) Date of Patent: Dec. 6, 2011

(54) LIQUID CRYSTAL DISPLAYS HAVING WIDE VIEWING ANGLES

(75) Inventors: Ming-Cheng Hsieh, Madou Township, Tainan County (TW); Yung-Yu Tsai, Yongkang (TW)

(73) Assignee: Chimei Innolux Corporation, Miaoli County (TW)

( * ) Notice: Subject to any disclaimer, the term of this patent is extended or adjusted under 35 U.S.C. 154(b) by 990 days.

(21) Appl. No.: 11/856,380

(22) Filed: Sep. 17, 2007

(65) Prior Publication Data

US 2008/0068314 A1 Mar. 20, 2008

(30) Foreign Application Priority Data

Sep. 18, 2006 (TW) .............................. 95134493 A

(51) Int. Cl.
G09G 3/36 (2006.01)
(52) U.S. Cl. ....................................................... 345/87
(58) Field of Classification Search .................... 345/87, 345/88; 349/56
See application file for complete search history.

(56) References Cited

U.S. PATENT DOCUMENTS

| 6,195,140 | B1 | 2/2001 | Kubo et al. | |
| 6,999,049 | B2 | 2/2006 | Hirota | |
| 7,139,052 | B2 | 11/2006 | Maeda | |
| 7,209,205 | B2 | 4/2007 | Yoshida et al. | 349/139 |
| 7,233,375 | B2 | 6/2007 | Chu et al. | 349/114 |
| 2004/0001167 | A1 | 1/2004 | Takeuchi et al. | |
| 2005/0280749 | A1 | 12/2005 | Jung et al. | |
| 2006/0267892 | A1* | 11/2006 | Pei et al. | 345/88 |
| 2007/0242009 | A1* | 10/2007 | Su | 345/87 |
| 2010/0149227 | A1* | 6/2010 | Tomizawa et al. | 345/694 |

FOREIGN PATENT DOCUMENTS

| CN | 1800955 | 7/2006 |
| CN | 1945393 | 4/2007 |
| TW | 588171 | 5/2004 |
| TW | 1228624 | 3/2005 |
| TW | 1264593 | 10/2006 |

OTHER PUBLICATIONS

Office Action, State Intellectual Property Office of the People's Republic of China Application No. 200710102523.7, 6 pages, Dec. 31, 2010.

* cited by examiner

*Primary Examiner* — Richard Hjerpe
*Assistant Examiner* — Jeffrey Parker
(74) *Attorney, Agent, or Firm* — Fish & Richardson P.C.

(57) ABSTRACT

A liquid crystal display includes sub-pixels each having a first display field and a second display field that both operate in a transmissive mode or both operate in a reflective mode. The first and second display fields of a sub-pixel are driven by a same driving device. The first and second display fields of a sub-pixel have different characteristics that cause liquid crystal layers in the first and second display fields to have different transmittances, the difference in transmittances of the first and second display fields being larger than a predetermined value.

21 Claims, 13 Drawing Sheets

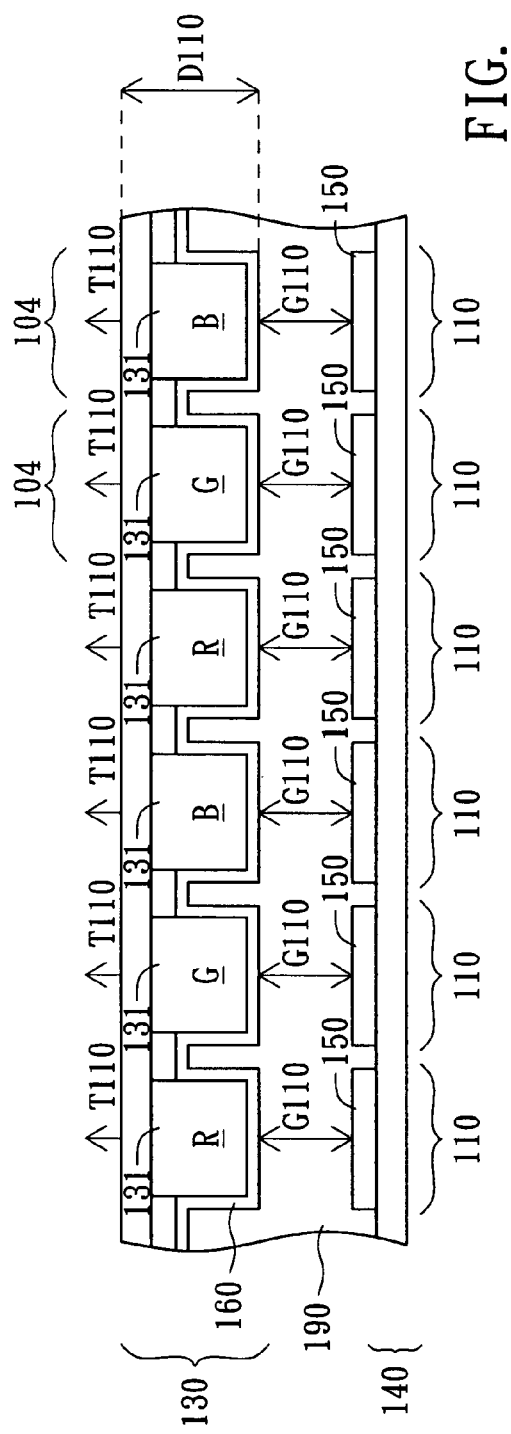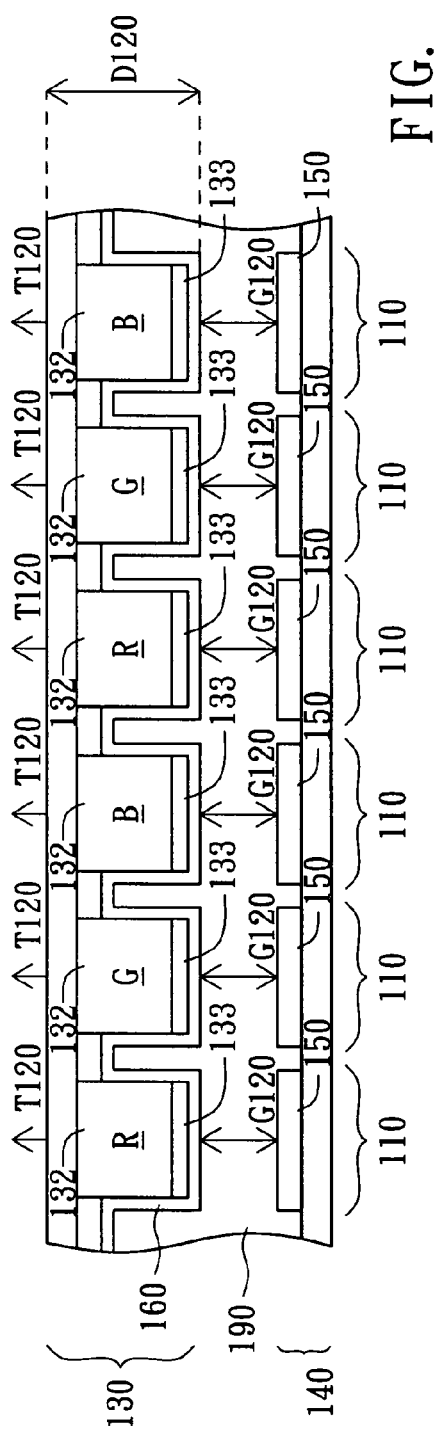
FIG. 1B
FIG. 1C

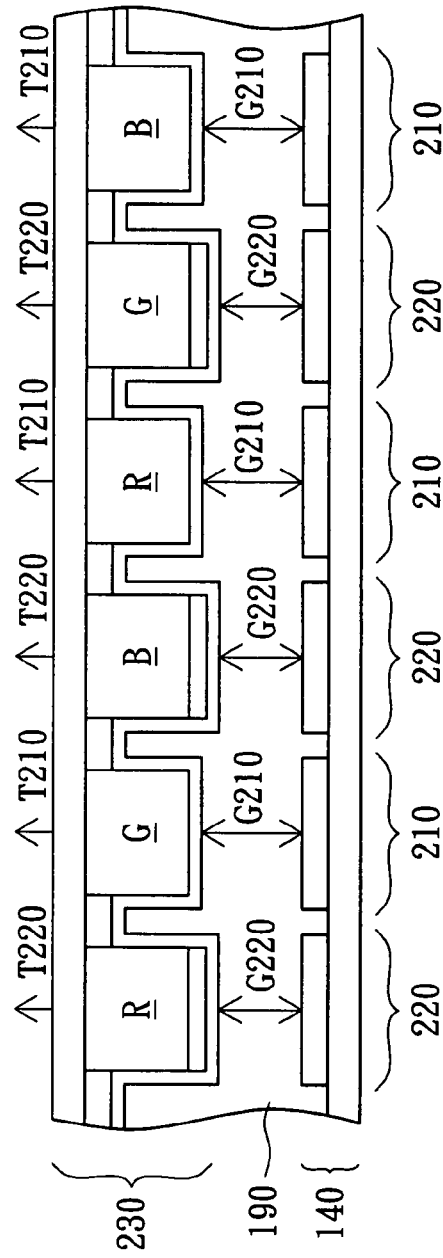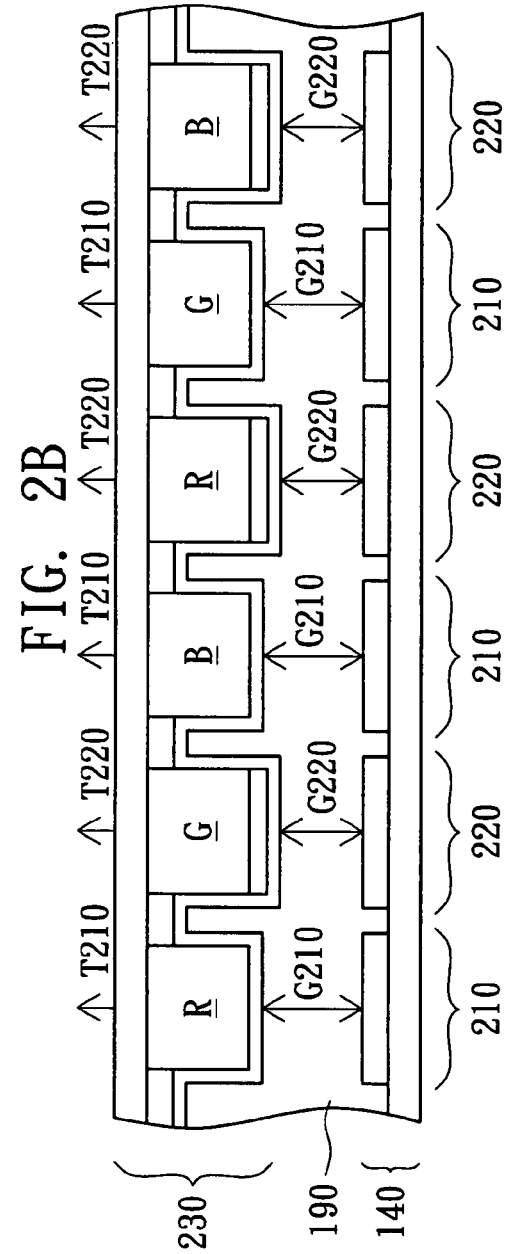

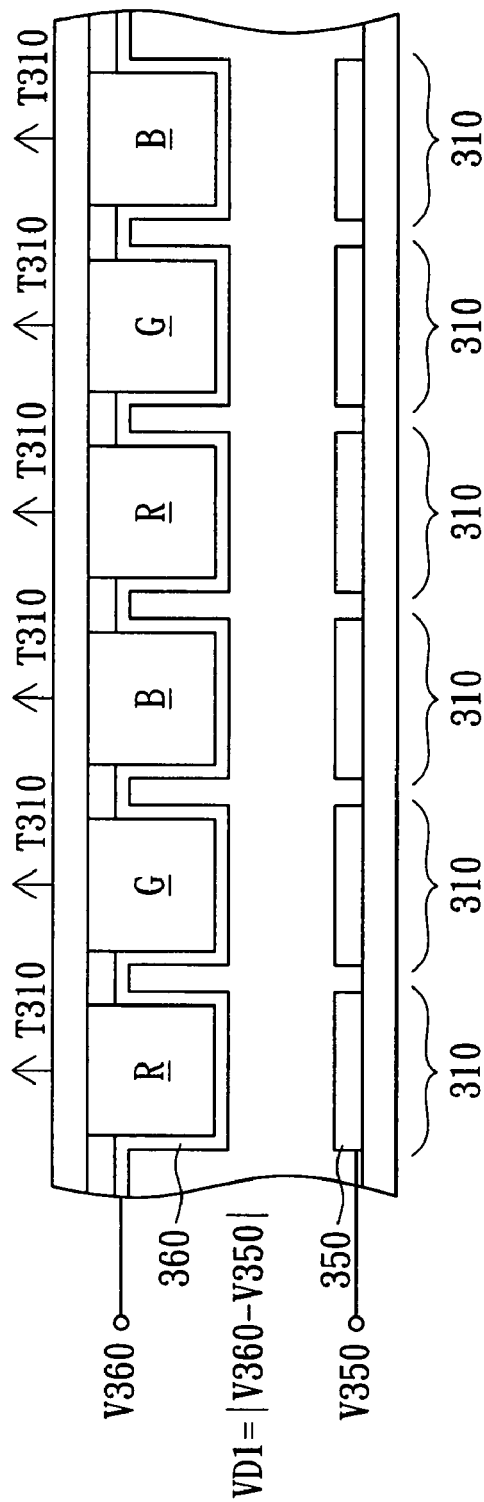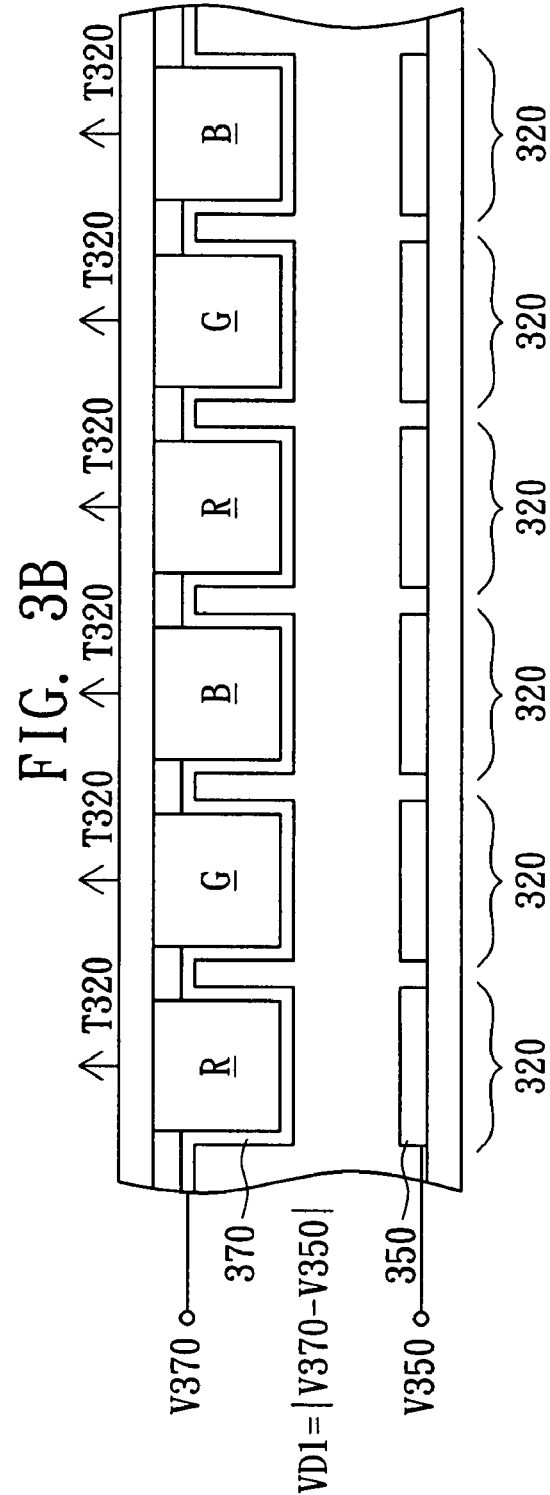
FIG. 3B
FIG. 3C

LIQUID CRYSTAL DISPLAYS HAVING WIDE VIEWING ANGLES

RELATED APPLICATIONS

This application claims priority to Taiwan application Serial No. 095134493, filed Sep. 18, 2006, the contents of which are incorporated by reference.

BACKGROUND

The description relates to liquid crystal displays having wide viewing angles.

The viewing angle of a liquid crystal display can be measured by determining the maximum angle at which the display can be viewed with acceptable image quality. When viewed from an angle greater than the viewing angle, the images on the display can appear distorted, blurry, and have poor saturation and contrast. In some implementations, the viewing angle of a display can be increased by using a multi-domain vertical alignment (MVA) technique. MVA uses alignment portions, alignment slits, or other types of alignment structures to guide the orientation of liquid crystals to form several domains within each pixel.

SUMMARY

In general, in one aspect, a liquid crystal display includes sub-pixels, each sub-pixel including a first display field and a second display field that either both operate in a transmissive mode or both operate in a reflective mode. The first and second display fields of a sub-pixel are driven by a same driving device, the first and second display fields of a sub-pixel having different characteristics that cause liquid crystal layers in the first and second display fields to have different transmittances.

Implementations can have one or more of the following features. When a pixel voltage corresponding to a particular gray level is applied to the sub-pixel, the first display field shows a gray level darker than the particular gray level, the second display field shows a gray level lighter than the particular gray level, and overall the sub-pixel appears to show the particular gray level. In some examples, each sub-pixel corresponds to a primary color shown on the display and, when the same pixel voltage is applied to a group of sub-pixels that correspond to the same primary color, the first display fields of the group of sub-pixels have substantially the same transmittance. In some examples, each sub-pixel corresponds to a primary color shown on the display and, when the same pixel voltage is applied to various sub-pixels that correspond to different primary colors, the first display fields of the sub-pixels have different transmittances. The driving device includes a thin film transistor. In some examples, the sub-pixels are oriented such that the position of the first display field relative the corresponding second display field is the same for a row of sub-pixels. In some examples, the sub-pixels are oriented such that, within a row of sub-pixels, the position of the first display field relative the corresponding second display field alternates from one sub-pixel to the next sub-pixel.

For example, the first display field and the second display field of the same sub-pixel can have different cell gaps. In some examples, each sub-pixel corresponds to a primary color shown on the display, and the first display fields that correspond to the same primary color have substantially the same cell gap. Each sub-pixel corresponds to a primary color shown on the display, each sub-pixel includes a color filter (CF) layer, and portions of the CF layers covering the first display fields of a group of sub-pixels associated with the same primary color have substantially the same thickness. In some examples, each sub-pixel corresponds to a primary color shown on the display, and the first display fields of various sub-pixels that correspond to different primary colors have different cell gaps. Each sub-pixel corresponds to a primary color shown on the display, each sub-pixel includes a color filter (CF) layer, and portions of the CF layers covering the first display fields of various sub-pixels associated with different primary colors have different thicknesses. Each sub-pixel includes a color filter (CF) layer, the CF layer having a first portion covering the first display field and a second portion covering the second display field, the first portion having a color layer, the second portion having a color layer and a transparent layer such that the second portion has a thickness greater than the first portion.

For example, each sub-pixel can include a first common electrode that corresponds to the first display field and a second common electrode that corresponds to the second display field, the first common electrode to connect to a first common voltage, the second common electrode to connect to a second common voltage that is different from the first common voltage. In some examples, each sub-pixel corresponds to a primary color shown on the display, and the first display fields of sub-pixels corresponding to the same primary color are associated with the same common electrode. In some examples, the first common electrode is coupled to a first direct-current voltage and the second common electrode is coupled to a second direct-current voltage. In some examples, the first common electrode is coupled to a first alternating-current common voltage and the second common electrode is coupled to a second alternating-current common voltage. The pixel electrode is coupled with an alternating-current pixel voltage, the frequency of the pixel voltage, the first common voltage and the second common voltage are substantially the same, and the average value of the pixel voltage, the average value of the first common voltage, and the average value of the second common voltage are substantially the same. The polarity of the first alternating-current common voltage is opposite to that of the second alternating-current common voltage. The first common electrode includes a plurality of first extending portions, the second common electrode includes a plurality of second extending portions, the first extending portions and the second extending portions being disposed alternately along a direction. Each of some first extending portions corresponds to two rows of the sub-pixels and each of some of the second extending portions correspond to two rows of the sub-pixels.

In general, in another aspect, a liquid crystal display includes sub-pixels each including a first display field and a second display field that either both operate in a transmissive mode or operate in a reflective mode. The first display field includes a liquid crystal layer between a pixel electrode and a first common electrode, and the second display field includes a liquid crystal layer between the pixel electrode and a second common electrode. The first common electrode connects to a first common voltage, and the second common electrode connects to a second common voltage that is different from the first common voltage to cause the first display field to have a transmittance different from that of the second display field.

In general, in another aspect, a liquid crystal display includes sub-pixels each including a first display field and a second display field. The first and second display fields are both driven by a same driving device, the first and second display fields having characteristics such that when a pixel voltage corresponding to a particular gray level is applied to the sub-pixel, the first display field shows a gray level darker than the particular gray level, the second display field shows a gray level lighter than the particular gray level, and overall the sub-pixel appears to show the particular gray level.

In general, in another aspect, a pixel voltage is applied to a pixel electrode of a sub-pixel of a display, the pixel electrode corresponding to a first display field and a second display field of the sub-pixel. A first common voltage is applied to a first common electrode that covers the first display field. A second common voltage is applied to a second common electrode that covers the second display field, the second common voltage being different from the first common voltage to cause the first display field to have a transmittance that is different from that of the second display field. Both the first and second display fields are operated in a transmissive mode or both the first and second display fields are operated in a reflective mode.

In general, in another aspect, a first display field and a second display field of a sub-pixel of a liquid crystal display are driven using a common driving device. The first and second display fields have characteristics such that when a pixel voltage corresponding to a particular gray level is applied to the sub-pixel, the first display field shows a gray level darker than the particular gray level, the second display field shows a gray level lighter than the particular gray level, and overall the sub-pixel appears to show the particular gray level.

Advantages of the apparatuses and methods described in this document can include one or more of the following. Color shift problems can be reduced. The liquid crystal displays do not require additional materials compared to conventional liquid crystal displays. The circuit design and pixel structures of the liquid crystal displays are simple and easy to fabricate. A wide viewing angle can be achieved. Image quality can be improved.

BRIEF DESCRIPTION OF THE DRAWINGS

FIGS. 1B and 1C are cross-sectional views of the display of FIG. 1A.
FIGS. 2B and 2C are cross-sectional views of the display of FIG. 2A.
FIGS. 3B and 3C are cross-sectional views of the display of FIG. 3A.

DETAILED DESCRIPTION

The following describes examples of liquid crystal displays that include sub-pixels each including multiple display fields having liquid crystal layers with different transmittances to reduce color shift at large viewing angles.

Figure 1A:
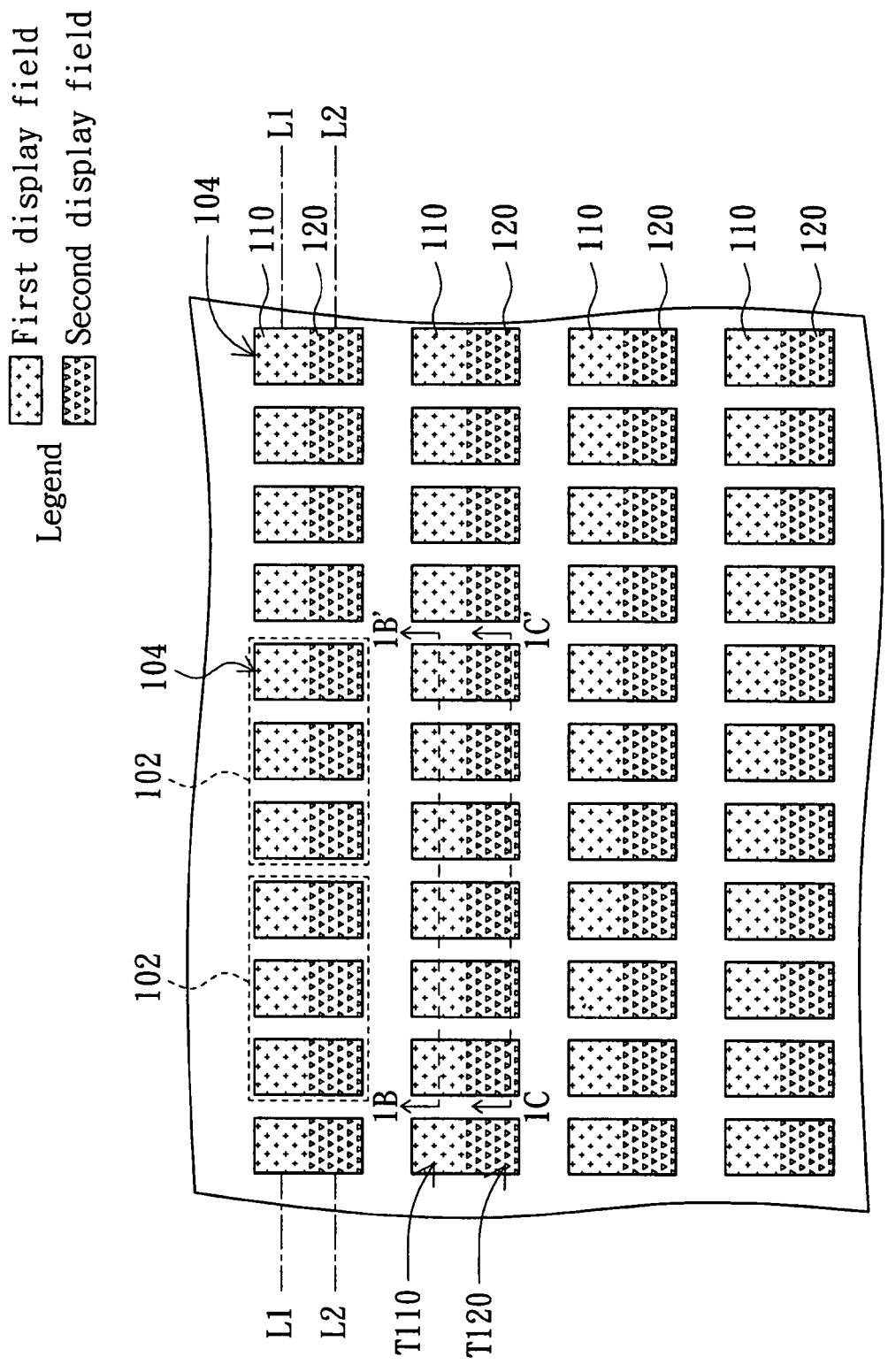
FIG. 1A is a top view of an array of sub-pixels of a display.

Referring to FIG. 1A, an example of a transmissive type liquid crystal display 100 includes an array of pixels 102, each pixel 102 including sub-pixels 104. Each sub-pixel 104 corresponds to one of the primary colors shown on the display 100, such as red, green, and blue. Each sub-pixel 104 includes a first display field 110 and a second display field 120. When a pixel signal (e.g., a pixel voltage) is applied to the sub-pixel 104, the first display field 110 has a first transmittance T110, and the second display field 120 has a second transmittance T120 that is different from the first transmittance T110. The display 100 includes a backlight module (not shown) that provides backlight that is modulated by the sub-pixels 104 to show images. The different transmittances T110 and T120 of the first and second display fields modulate the backlight so that the first and second display fields 110 and 120 exhibit different luminance or brightness, while overall the sub-pixel 104 still shows an intended luminance defined by the pixel signal.

An advantage of the display 100 is that it has small or no perceivable color shift in images shown on the display 100 when viewed at an angle. The color shift phenomenon is explained as follows. Due to birefringence of liquid crystals of the display, the brightness of the sub-pixels may be different when a user views the display at an angle, compared to the brightness of the sub-pixels when viewed at a direction normal to the display. The amount of variation in brightness can be different for different primary colors. Because the color of each pixel is determined by a combination of the primary colors shown by its sub-pixels, variations in primary color brightness results in a shift in the pixel color. As a result, when a user views the display from different angles, colors of images on the display may change. For example, the overall colors of the images may shift towards blue or yellow, impairing image quality.

In some implementations, the first display field of a sub-pixel has a transmittance slightly higher than an intended transmittance to be exhibited by the sub-pixel, and the second display field of the sub-pixel has a transmittance slightly lower than the intended transmittance. The average transmittance of the sub-pixel is approximately equal to the intended transmittance for a wide range of viewing angles, thereby reducing the color shift problem.

The intended transmittance refers to the transmittance that results in an intended gray scale level (which corresponds to an intended luminance) according to a pixel signal sent from a host device, such as a computer. For example, the computer may send to the display a pixel signal indicating that a particular sub-pixel should show a gray level G. In response, the first display field may show a gray level G+Δ1 and the second display field may show a gray level G−Δ2, so the overall gray level of the sub-pixel may appear close to G, the intended gray level. The deviations Δ1 and Δ2 may change as the viewing angle changes, but the overall gray level of the sub-pixel remains approximately equal to G for a wide range of viewing angles. Thus, the use of two transmittances T110 and T120 for each sub-pixel results in uniform display quality for a wide range of viewing angles.

The amount of difference in the transmittances of the first and second display fields is selected so that color shift is reduced to an acceptable level for a specified viewing angle. The specific amount of difference in transmittances of the first and second display fields can be different for different types of displays.

In the example of FIGS. 1A-1C, the sub-pixels 104 include normally black vertically aligned cells in which the sub-pixels are black and the liquid crystal molecules are aligned in the vertical direction (direction normal to the substrates)

when no voltage is applied to the sub-pixels 104. The display can have other liquid crystal modes. For example, the sub-pixels can be normally white, and the display can be a twisted nematic (TN) type or an in-plane switching (IPS) type.

The display 100 may include additional components not shown in the figures, such as a backlight unit, polarization films, and compensation films.

In some implementations, the first transmittances T110 of the first display fields 110 of different sub-pixels are substantially the same, and the second transmittances T120 of the second display fields 120 of the different sub-pixels are substantially the same. In the example of FIG. 1A, the sub-pixels are oriented such that the position of the first display field relative to the second display field is the same from one sub-pixel to another. The first display fields 110 are disposed along a line L1, and the second display fields 120 are disposed along a line L2. The first display fields 110 are positioned on the upper side of the sub-pixels 104, and the second display fields 120 are positioned on the lower side of the sub-pixels 104.

The terms describing relative positions and orientations, such as "upper", "lower", "left", and "right", are merely used to explain positions and orientations of certain components of the display relative to other components, and are not intended to limit the display to those described in this document. For example, the display can be used in various orientations, thus an "upper portion" of a sub-pixel in the examples described here can in some cases be lower than a "lower portion" of the sub-pixel described here.

The term "sub-pixel" is used to refer to a smallest display unit that can be individually controlled to show various gray scale levels. In a color display, a color pixel includes sub-pixels each corresponding to one of the primary colors (e.g., red, green, and blue). Depending on context, the term "sub-pixel" may be used interchangeably with the term "pixel". For example, in a monochrome display that can show different gray levels of a single color, the smallest display unit that can be individually controlled is a pixel.

The following describes how different transmittances for the first display field 110 and the second display field 120 can be achieved.

FIG. 1B is a cross-sectional view of the liquid crystal display 100 (FIG. 1A) along a cross-section 1B-1B'. FIG. 1C is a cross-sectional view of the liquid crystal display 100 along a cross-section 1C-1C'. Each sub-pixel 104 includes a color filter layer 130 and a thin-film transistor (TFT) layer 140. A liquid crystal layer 190 is provided between the color filter layer 130 and the TFT layer 140. The color filter layer 130 is fabricated on a first substrate (not shown), sometimes referred to as a color filter substrate. The TFT layer 140 is fabricated on a second substrate (not shown), sometimes referred to as a TFT substrate. The first and second substrates can be made of, e.g., glass.

A common electrode 160 is provided between the color filter layer 130 and an upper side of the liquid crystal layer 190. Pixel electrodes 150 are provided between the TFT layer 140 and a lower side of the liquid crystal layer 190. Each sub-pixel 104 corresponds to a separate pixel electrode 150. The common electrode 160 and the pixel electrodes 150 can be made of, e.g., indium-tin-oxide (ITO).

A common voltage is applied to the common electrode 160, and pixel voltages are applied to the pixel electrodes 150. This generates an electric field across the liquid crystal layer 190 of each of the sub-pixels 104 to change the orientations of liquid crystal molecules in the liquid crystal layer 190 and the optical phase retardation of the layer 190, thereby changing the amount of light that passes the layer 190. Each sub-pixel of the display 100 can show a range of gray scale levels depending on the voltage applied across the liquid crystal layer 190. The color filter layer 130 filters light to generate color.

The first display field 110 has a first cell gap G110 (FIG. 1B), which is the distance between the common electrode 160 and the pixel electrode 150. The second display field 120 has a second cell gap G120 (FIG. 1C) that is different from the first cell gap G110.

In some implementations, the sub-pixels 104 are configured such that the transmittance of a sub-pixel increases as the electric field in the liquid crystal layer increases, and vice versa. In the example of FIGS. 1B and 1C, the first cell gap G110 is greater than the second cell gap G120, so the electric field across the liquid crystal layer 190 in the first display field 110 is lower than the electric field in the second display field 120. As a result, the first transmittance T110 of the first display field 110 is lower than the second transmittance T120 of the second display field 120.

In some implementations, the first cell gaps G110 of all the first display fields 110 are substantially the same, and the second cell gaps G120 of all the second display fields 120 are substantially the same. Thus, when the same pixel voltage is applied to all the sub-pixels, the first transmittances T110 of all the first display fields 110 are substantially the same, and the second transmittances T120 of different second display fields 120 are substantially the same. Here, "substantially the same" means that the first cell gaps G110 are designed to be the same and the second cell gaps G120 are designed to be the same, but there may be small variations due to manufacturing tolerances.

The first cell gap G110 and the second cell gap G120 can be selected according to factors such as the material of the liquid crystal, the maximum driving voltage applied across the liquid crystal layer 190, the size of the display 100, and the amount of difference between the transmittances of the first and second display fields.

For a certain range of cell gap sizes, increasing the difference in cell gaps between the first and second display fields will more effectively remedy the color shift problem. As the difference in cell gap sizes increases, the difference between the intended color (or gray level) and the colors (or gray levels) shown by the first and second display fields increases. When the difference in first and second cell gaps increases beyond a certain level, the combination of the two colors shown by the first and second display fields of a sub-pixel may be noticeably different from the intended color. This may cause the image quality to degrade even when viewing the display at a normal incidence angle because the pixels do not accurately show the intended colors. Thus, the cell gap sizes of the first and second display fields 110 and 120 are selected to reduce the color shift problem at wide viewing angles while not noticeably degrading the overall image quality.

The different cell gap sizes can be achieved by using color filter layers having different thicknesses. For example, the color filter layer 130 of the first display field 110 has a first thickness D110, and the color filter layer 130 of the second display field 120 has a second thickness D120 that is different from the first thickness D110. In the example of FIGS. 1B and 1C, the first thickness D110 is less than the second thickness D120, so the first cell gap G110 is greater than the second cell gap G120. In the example of FIGS. 1B and 1C, the first display fields 110 of all the sub-pixels have substantially the same first thickness D110, and the second display fields 120 of all the sub-pixels have substantially the same second thickness D120.

The difference in thicknesses of the color filter layers 130 of the first and second display fields 110 and 120 can be achieved by adding a transparent layer to the color filter layers 130 of the second display fields 120. For example, the color filter layer 130 that corresponds to the first display field 110 includes a first primary color layer 131, such as a red, green or blue layer. The color filter layer 130 that corresponds to the second display field 120 includes a second primary color layer 132 and a transparent layer 133. The thickness D131 of the first primary color layer 131 is substantially the same as the thickness D132 of the second primary color layer 132. Thus, the second thickness D120 of the color filter layer 130 of the second display field 120 is greater than the first thickness D110 of the color filter layer 130 of the first display field 110. For example, the transparent layer 133 can be made of an organic transparent material or a transparent photoresist layer.

In the example above, the cell gaps G110 and G120 that correspond to the first and second display fields 110 and 120, respectively, are determined in part by the first and second thicknesses D110 and D120 of the color filter layer 130. Alternatively, in some implementations, the difference in the cell gaps G110 and G120 can be achieved by adjusting the thickness of the TFT layer 140. For example, the TFT layer 140 can have a first portion corresponding to the first display field 110 with a first thickness, and a second portion corresponding to the second display field 110 with a second thickness.

In the example of FIGS. 1B and 1C, the first display fields 110 for all sub-pixels have the same cell gaps and same transmittances regardless of color. Similarly, the second display fields 120 for all sub-pixels have the same cell gaps and same transmittances regardless of color. Alternatively, in some implementations, the cell gaps of the first and second display fields may depend on color. Sub-pixels 104 associated with different primary colors may have different characteristics, such as different levels of color shift and different color temperature. These differences can be taken into account when designing the display 100 by having different cell gaps and transmittances for sub-pixels that correspond to different primary colors.

For example, the first thickness D110 and the first cell gap G110 may depend on the primary color. The first thickness D110 and the first cell gap G110 of sub-pixels 104 that correspond to the same primary color can be substantially the same, while the first thickness D110 and the first cell gap G110 of sub-pixels 104 that correspond to different primary colors can be slightly different. Thus, for a given pixel voltage, the first transmittances T110 associated with the same primary color can be substantially the same, while the first transmittances T110 associated with different primary colors may be slightly different.

Similarly, the second thickness D120 and second cell gap G120 may depend on the primary color. The second thickness D120 and the second cell gap G120 of sub-pixels 104 that correspond to the same primary color can be substantially the same, while the second thickness D110 and the second cell gap G110 of sub-pixels 104 that correspond to different primary colors can be slightly different. Thus, for a given pixel voltage, the second transmittance T120 associated with the same primary color can be substantially the same, while the second transmittances T120 associated with different primary colors may be slightly different. This allows the transmittances of sub-pixels to be fine-tuned according to the primary colors, resulting in better image quality.

Figure 2A:
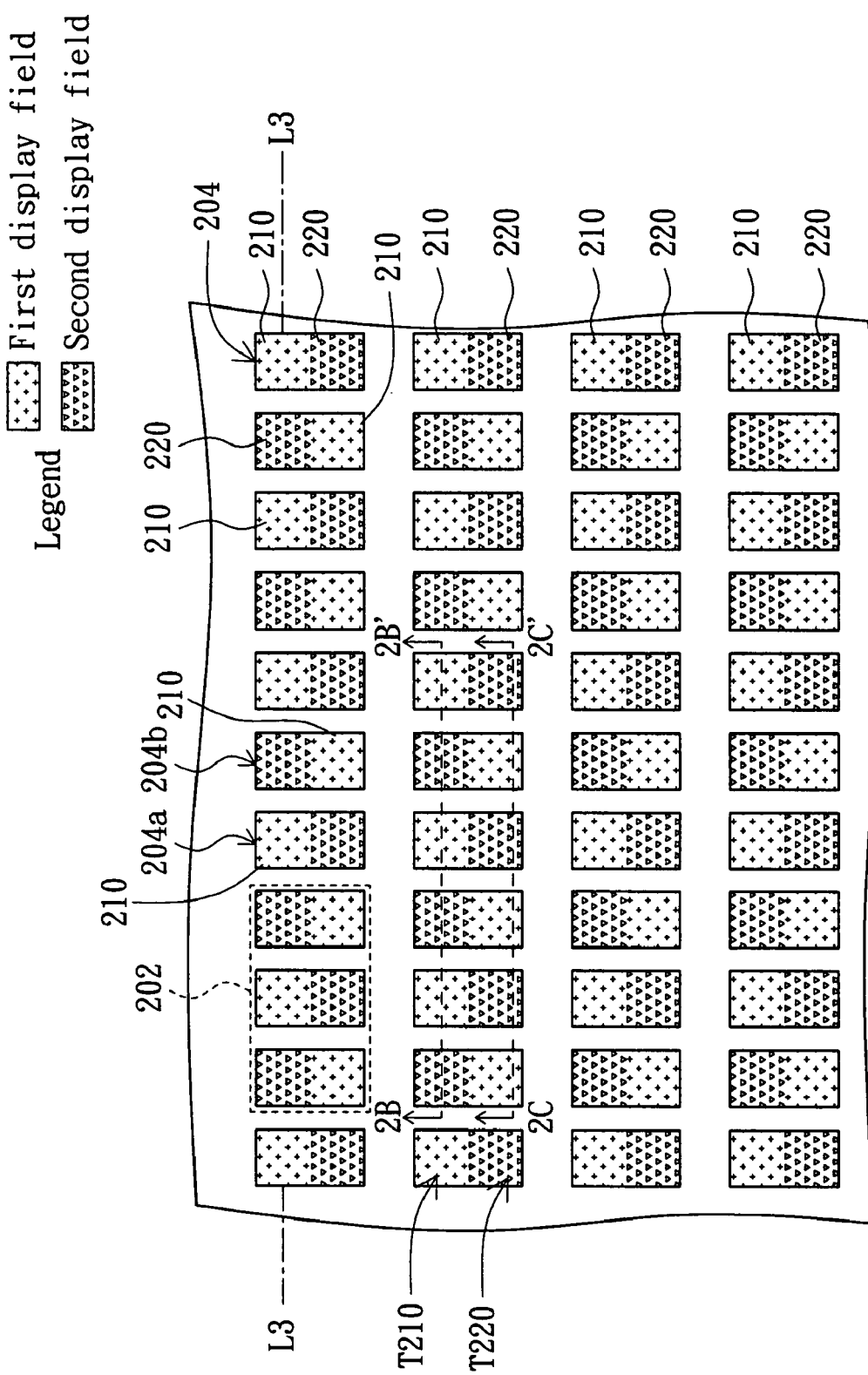
FIG. 2A is a top view of an array of sub-pixels of a display.

Referring to FIG. 2A, an example of a liquid crystal display 200 includes an array of pixels 202, each pixel 202 including sub-pixels 204, each sub-pixel 204 including a first display field 210 and a second display field 220. The display 200 of FIG. 2A is similar to the display 100 of FIG. 1A except that the sub-pixels 204 in the display 200 are oriented in a way such that the position of the first display field 210 relative to the second display field 220 alternate from one sub-pixel 204 to the next within a row of sub-pixels. For example, the first display fields 210 and the second display fields 220 alternates along a line L3. A sub-pixel 204a has a first display field 210 in the upper portion while an adjacent sub-pixel 204b has a first display field 210 in the lower portion.

FIG. 2B is a cross-sectional view of the liquid crystal display 200 along a cross-section 2B-2B'. FIG. 2C is a cross-sectional view of the liquid crystal display 200 along a cross-section 2C-2C'. The upper halves (that correspond to the first display fields 210) of some sub-pixels have a first cell gap G210, while the upper halves (that correspond to the second display fields 220) of some sub-pixels have a second cell gap G220.

The upper halves of a row of sub-pixels 204 have cell gaps that alternate between cell gap 220 and cell gap 210. The upper halves of the row of sub-pixels 204 have transmittances that alternate between the second transmittance T220 and the first transmittance T210. For example, the first and second transmittances T210 and T220 alternate along the line L3. The lower halves of the row of sub-pixels 204 have cell gaps that alternate between cell gap 210 and cell gap 220. The lower halves of the row of sub-pixels 204 have transmittances that alternate between the first transmittance T210 and the second transmittance T220.

In some implementations, the first thickness D210 and the first cell gap G210 of all the first display fields 210 that correspond to the same primary color are substantially the same, so the first transmittances T210 of sub-pixels that correspond to the same primary color are substantially the same. The second thickness D220 and the second cell gap G220 of all the second display fields 220 that correspond to the same primary color are substantially the same, so the second transmittances T220 of sub-pixels that correspond to the same primary color are substantially the same.

In some implementations, the display 200 is designed by taking into account different characteristics of sub-pixels associated with different primary colors, such as different levels of color shift, different color temperature, and different color offset. For example, the first thickness D210 and the first cell gaps G210 may depend on the primary color. The first thickness D210 and the first cell gap G210 of sub-pixels 204 that correspond to different primary colors can be slightly different. For a given pixel voltage, the first transmittances T210 for different primary colors may be slightly different. Similarly, the second thickness D220 and the second cell gaps G220 of sub-pixels 204 that correspond to different primary colors can be slightly different. For a given pixel voltage, the second transmittances T220 for different primary colors may be slightly different. This allows the transmittances of sub-pixels to be fine-tuned according to the primary colors.

In some implementations, rather than having different cell gaps for the first and second display fields (as in the examples of FIGS. 1A to 2C), different common voltages can be applied to the first and second display fields to cause the first and second display fields to have different transmittances.

Figure 3A:
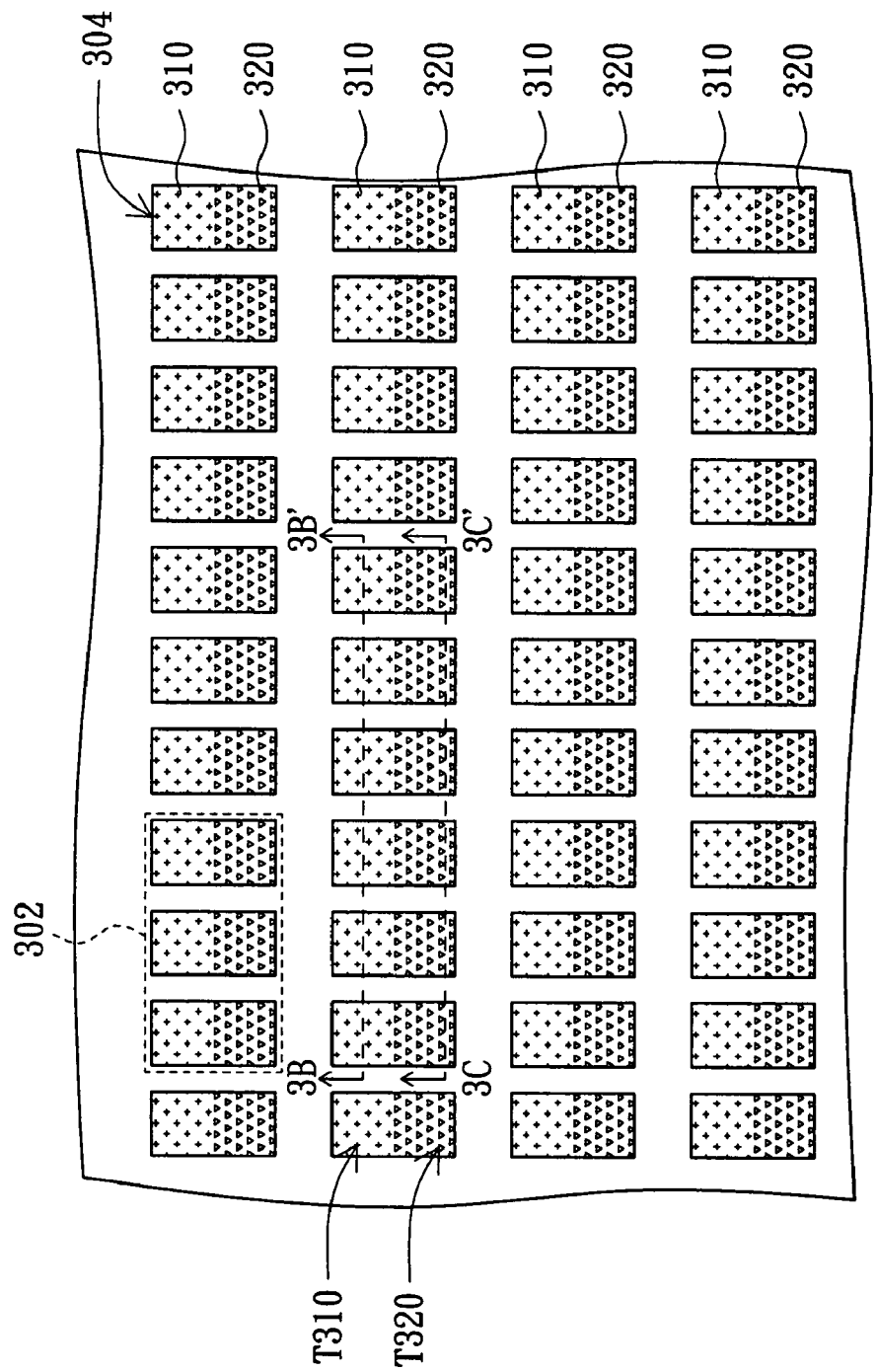
FIG. 3A is a top view of an array of sub-pixels of a display.

Referring to FIG. 3A, an example of a liquid crystal display 300 includes an array of pixels 302, each pixel 302 including sub-pixels 304, each sub-pixel 304 including a first display field 310 and a second display field 320. The first display field 310 has a first transmittance T310, and the second display field 320 has a second transmittance T320 that is different from the first transmittance T310. The difference between the display 300 and the display 100 (FIG. 1A) is that the display 300 has the same cell gap for the first and second display fields 310 and 320, but the first and second display fields 310 and 320 correspond to different common electrodes that are connected to different common voltages. In FIG. 3A, the first display fields 310 are represented by small "+" symbols, and the second display fields 320 are represented by small "∇" symbols.

FIG. 3B is a cross-sectional view of the liquid crystal display 300 (FIG. 3A) along a cross-section 3B-3B'. FIG. 3C is a cross-sectional view of the liquid crystal display 300 along a cross-section 3C-3C'. Each sub-pixel 304 includes a pixel electrode 350, a first common electrode 360 and a second common electrode 370. The first common electrode 360 corresponds to the first display field 310, and the second common electrode 370 corresponds to the second display field 320. A top view of the first and second common electrodes 360 and 370 is provided in FIG. 3G.

Figure 3D:
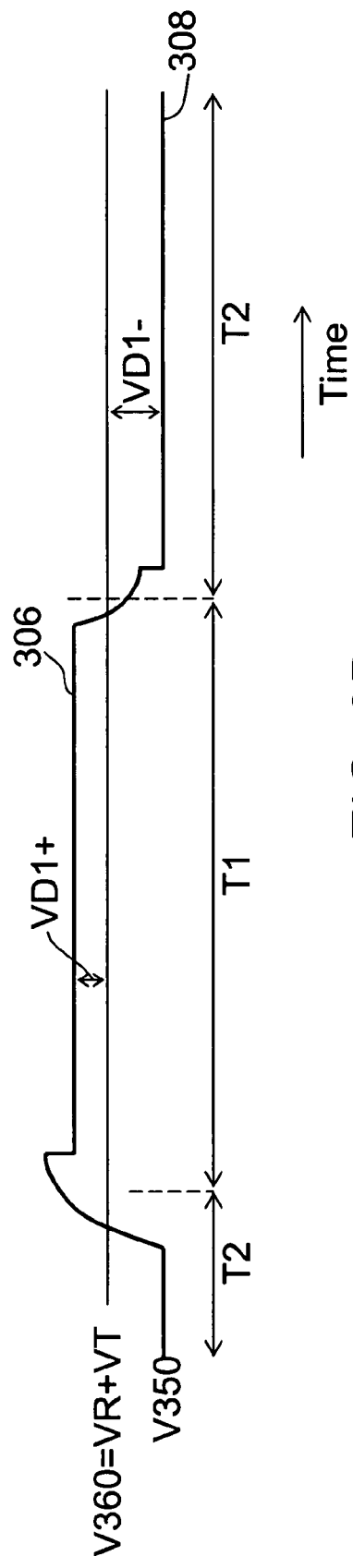
FIGS. 3D and 3E are signal timing diagrams.
Figure 3E:
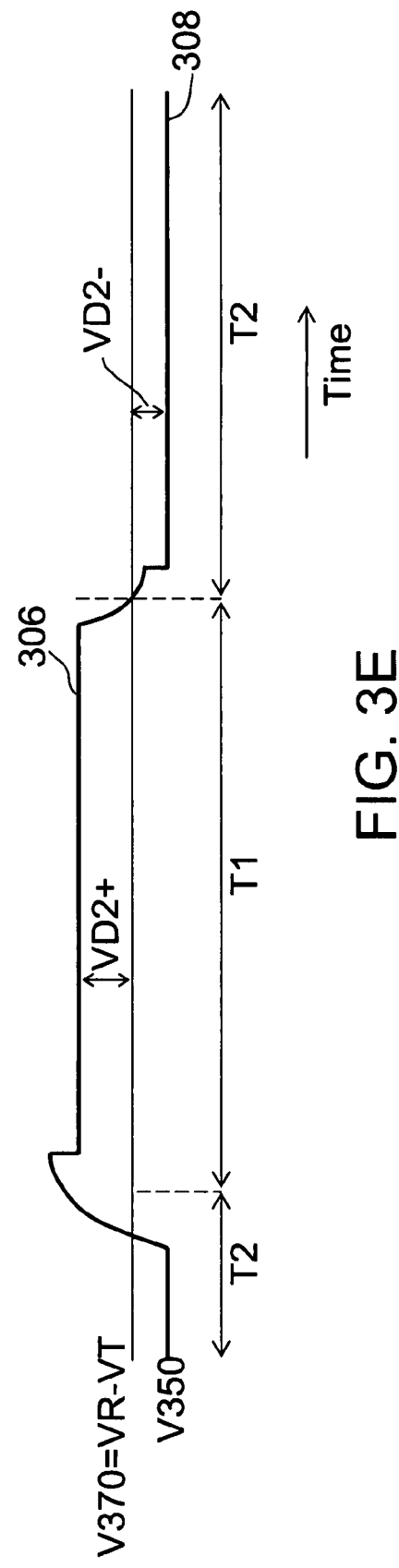

The first common electrode 360 is coupled to a first direct-current (DC) common voltage V360, and the second common electrode 370 is coupled to a second direct-current common voltage V370. The pixel electrode 350 is coupled to a pixel voltage V350 (also referred to as pixel signal or display data, which represents a gray scale level to be shown by the sub-pixel). A first voltage difference VD1+ or VD1− is generated between the first common electrode 360 and the pixel electrode 350. The signal waveform of the first voltage difference VD1+ and VD1− is shown in FIG. 3D. A second voltage difference VD2+ or VD2− is between the second common electrode 370 and the pixel electrode 350. The signal waveform for the second voltage difference VD2+ and VD2− is shown in FIG. 3E. The first voltage difference VD1+ has an amplitude different from that of the second voltage difference VD2+. The first voltage difference VD1− has an amplitude different from that of the second voltage difference VD2−.

The sub-pixels 304 have a structure such that the transmittance of the sub-pixel 304 increases as the voltage difference across the liquid crystal layer increases. Because the first voltage difference VD1+ or VD1− is different from the second voltage difference VD2+ or VD2−, the first transmittance T310 of the first display field 310 is different from the second transmittance T320 of the second display field 320.

FIG. 3D is a timing diagram for the first common voltage V360 and the pixel voltage V350. During a time period T1, the pixel voltage V350 has a high level 306. During a time period T2, the pixel voltage V350 has a low level 308. The first common voltage V360 is equal to a direct-current reference voltage VR plus a shifting voltage VT.

FIG. 3E is a timing diagram for the second common voltage V370 and the pixel voltage V350. The second common voltage V370 is equal to the reference voltage VR minus the shifting voltage VT. The first common voltage V360 is closer to the high level 306 of the pixel voltage V350, and the second common voltage V370 is closer to the low level 308 of the pixel voltage V350.

During a time period T1, the first display field 310 has a voltage difference VD1+=V350−VR−VT across the liquid crystal layer, and the second display field 320 has a voltage difference VD2+=V350−VR+VT across the liquid crystal layer. VD2+ is greater than VD1+. The difference between VD1+ and VD2+ results in different electric fields across the liquid crystal layers of the first and second display fields 310 and 320. This causes the first and second display fields 310 and 320 to have different transmittances. This has an effect similar to using different cell gap sizes to produce different transmittances in the first and second display fields in the examples shown in FIGS. 1A to 2C.

During a time period T2, the first display field 310 has a voltage difference VD1−=VR+VT−V350 across the liquid crystal layer, and the second display field 320 has a voltage difference VD2−=VR−VT−V350 across the liquid crystal layer. VD1− is greater than VD2−. Similar to the situation in time period T1, the difference in VD1− and VD2− generate different electric fields across the liquid crystal layers of the first and second display fields 310 and 320 to cause the first and second display fields 310 and 320 to have different transmittances.

The pixel voltage V350 switches between the high level 306 and the low level 308 so that the polarity of the voltage applied across the liquid crystal layer alternates over time. This helps reduce stress on the liquid crystal material and increases the lifetime of the liquid crystal display 300.

In selecting the values for voltages V350, VR, and VT, a number of factors are taken into account, including the desired optimal transmittance, the viewing angle, and the desired overall display quality.

In the example of FIGS. 3D and 3E, the second voltage difference VD2+ is higher, which results in higher transmittance T320 of the second display field 320 than the transmittance T310 of the first display field 310.

For a given pixel voltage, the voltage differences VD1+ or VD1− for the first display fields 310 of different sub-pixels 304 are substantially the same. The first transmittances T310 of the first display fields 310 of different sub-pixels 304 are substantially the same. Similarly, for a given pixel voltage, the voltage differences VD2+ or VD2− for the second display fields 320 of different sub-pixels 304 are substantially the same. The second transmittances T320 of the second display fields 320 of different sub-pixels are substantially the same.

Figures 3F, 3G:
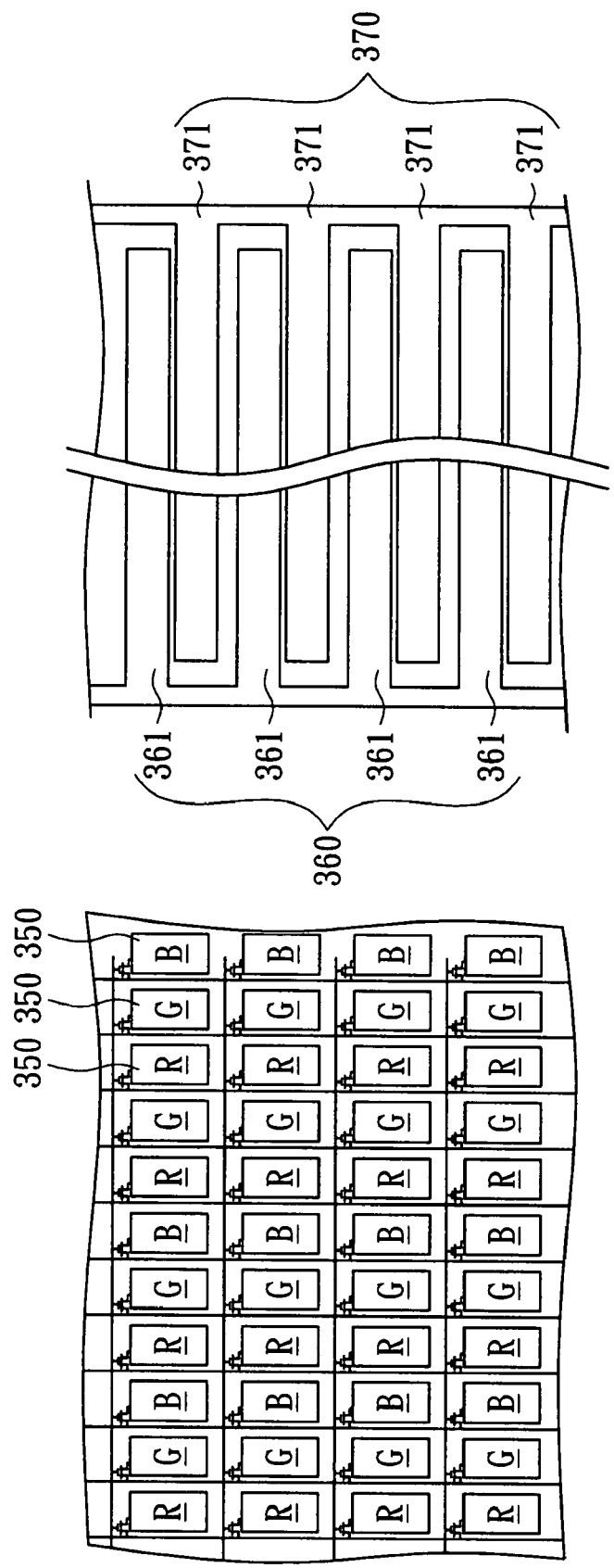
FIG. 3F is a schematic diagram of pixel electrodes of the display of FIG. 3A.
FIG. 3G is a schematic diagram of common electrodes of the display of FIG. 3A.

FIG. 3F is a diagram showing an arrangement of the pixel electrodes 350. The pixel electrodes 350 are arranged in an array having rows and columns, each pixel electrode 350 corresponding to one of the sub-pixels 304.

FIG. 3G is a diagram showing an arrangement of the first common electrode 360 and the second common electrode 370. The first common electrode 360 includes several first extending portions 361 that extend along the row direction, and the second common electrode 370 includes several second extending portions 371 also extending along the row direction. The first extending portions 361 and the second extending portions 371 are positioned alternately along the column direction.

Each extending portion 361 covers the upper halves of a row of sub-pixels 304 and corresponds to the first display fields 310. Each extending portion 371 covers the lower halves of a row of sub-pixels 304 and corresponds to the second display fields 320.

Figure 4:
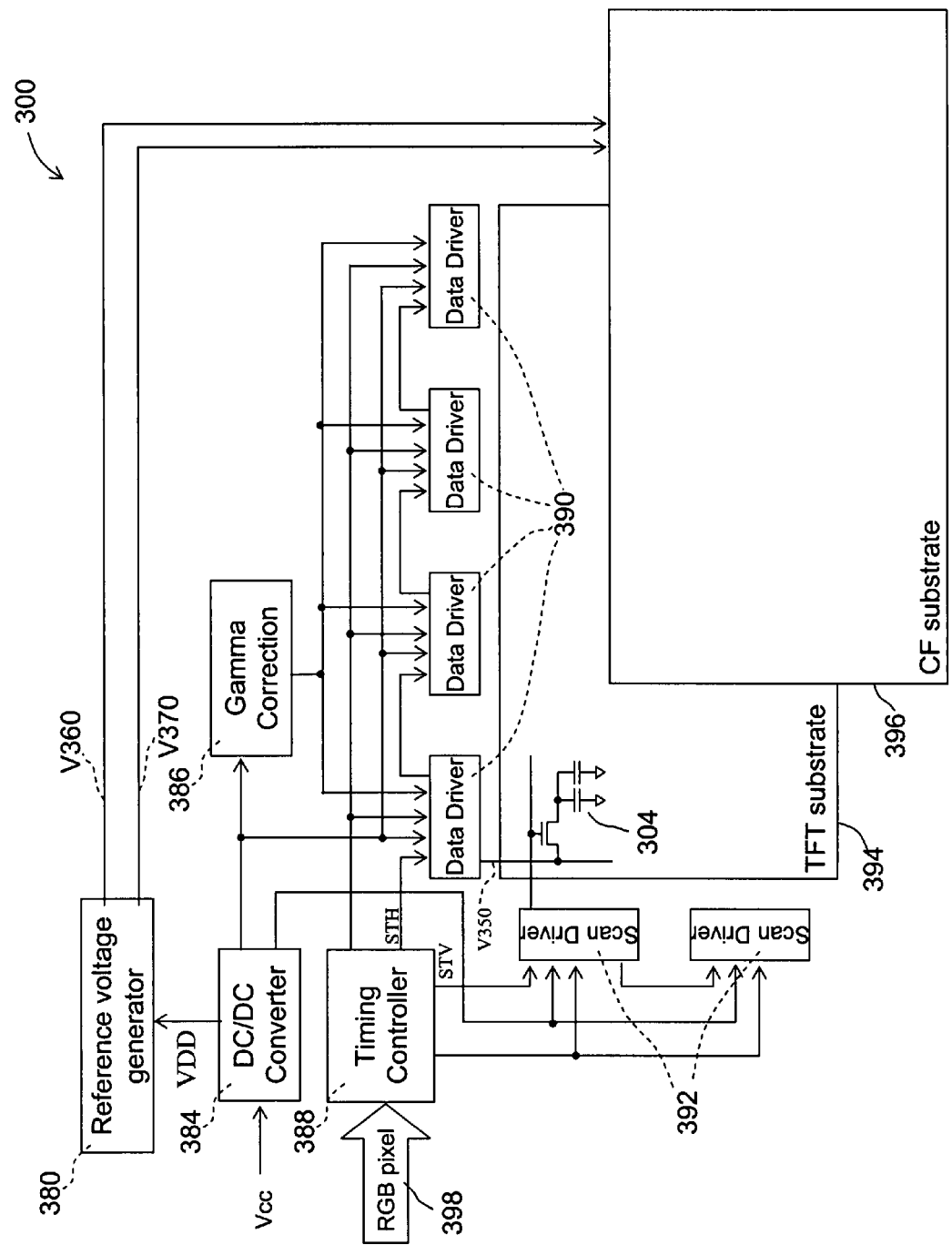
FIG. 4 is a block diagram of a display.

FIG. 4 is a schematic diagram of an example of the display 300. The display 300 includes an array of sub-pixels 304 between a TFT substrate 394 and a color filter substrate 306. The sub-pixels 304 are controlled by one or more gate drivers 392 and one or more data drivers 390. A DC/DC converter 384 receives an input power supply voltage Vcc and generates various power supply voltages for other components of the display 300. A reference voltage generator 380 receives a VDD voltage from the DC/DC converter 384 and generates the common voltages V360 and V370. The common voltage V360 is applied to the first common electrode, and the common voltage V370 is applied to the second common electrode 370.

A timing controller 388 receives pixel data 398 and generates timing signals for controlling the scan drivers 392 and the data drivers 390. The data drivers 390 receive the timing control signals and pixel data 398 from the timing controller 388, receive gamma correction signals from a gamma correction unit 386, and generates pixel voltages V350 for driving the sub-pixels 302 to show gray scale levels according to the pixel data.

Figure 5:
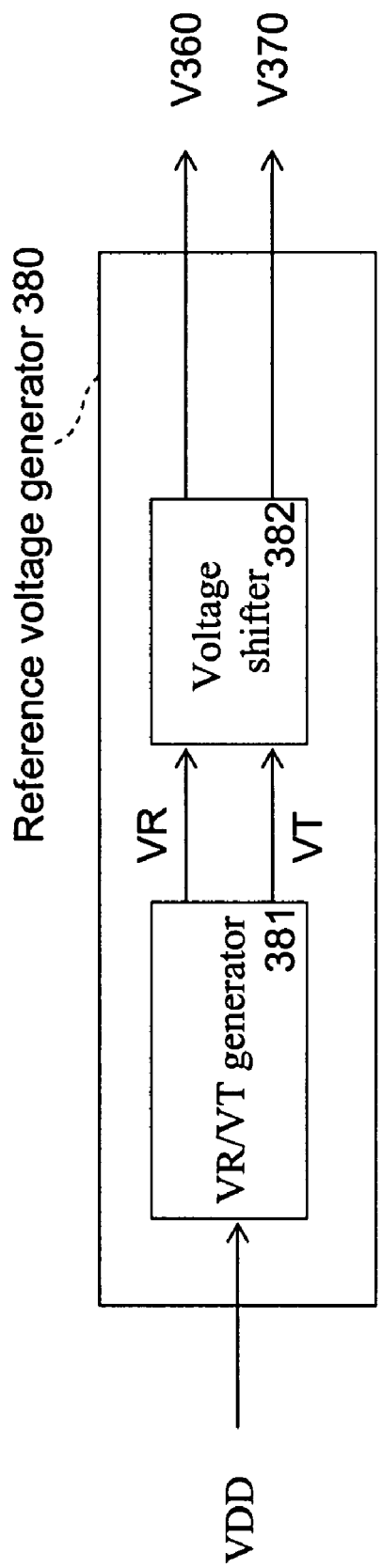
FIG. 5 is a block diagram of a reference voltage generator.

FIG. 5 is a block diagram of the reference voltage generator 380. The reference voltage generator 380 includes a VR/VT generator 381 that receives the VDD power supply voltage from the DC/DC converter 384 and generates voltages VR and VT. A voltage shifter 382 receives the voltage signals VR and VT, and generates common voltages V360 and V370 in which V360=VR+VT and V370=VR−VT.

Figure 6A:
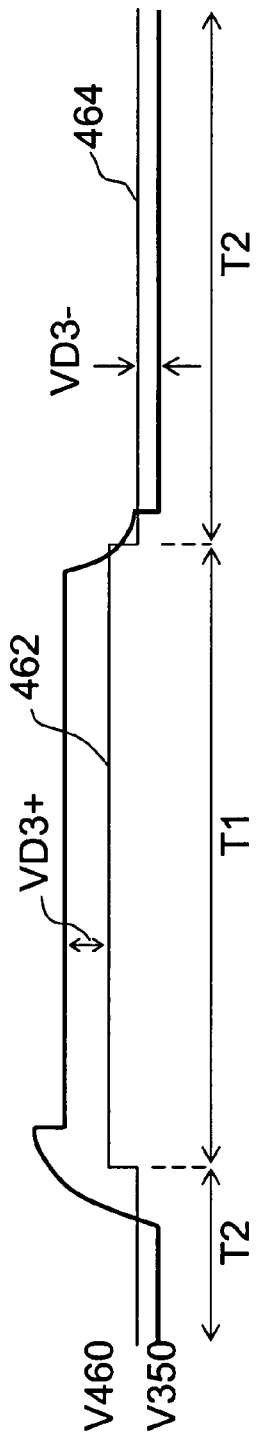
FIGS. 6A and 6B are signal timing diagrams.
Figure 6B:
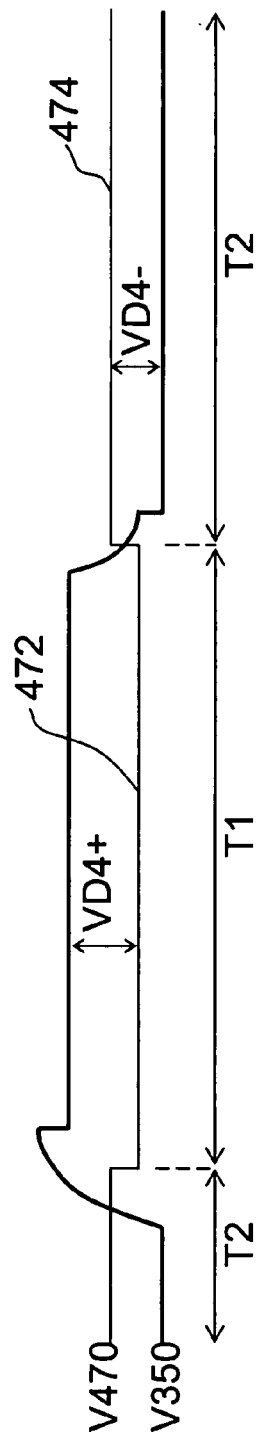

In some implementations, the common electrodes 360 and 370 can be coupled to alternating-current common voltages. FIG. 6A is a timing diagram of an example of a first alternating-current common voltage V460 and the pixel voltage V350. FIG. 6B is a timing diagram of an example of a second alternating-current common voltage V470 and the pixel voltage V350. The first common voltage V460 is applied to the first common electrode 360, and the second common voltage V470 is applied to the second common electrode 370.

During time periods T1 and T2, first voltage differences VD3+ and VD3−, respectively, are generated between the first common electrode 360 and the pixel electrode 350. During time periods T1 and T2, second voltage differences VD4+ and VD4−, respectively, are generated between the second common electrode 370 and the pixel electrode 350. The frequencies of the pixel voltage V350, the first common voltage V460, and the second common voltage V470 are substantially the same. The average value of the pixel voltage V350, the average value of the first common voltage V460, and the average value of the second common voltage V470 are substantially the same. This way, the voltage difference VD3+ is substantially the same as the voltage difference VD3−. For a given pixel voltage, and the voltage difference applied to the liquid crystal layer of the first display field 310 remains substantially constant for both time periods T1 and T2, so that transmittance of the first display field remains the same for both time periods T1 and T2. Similarly, the voltage difference applied to the liquid crystal layer of the second display field 320 remains substantially constant for both time periods T1 and T2, so that transmittance of the second display field remains the same for both time periods T1 and T2. This reduces flicker and improves image quality.

The first alternating-current common voltage V460 has a polarity that is opposite to the polarity of the second alternating-current common voltage V470. For example, during time period T1, the first alternating-current common voltage V460 is at a high level 462 while the second alternating-current common voltage V470 is at a low level 472. During time period T2, the first alternating-current common voltage V460 is at a low level 464 while the second alternating-current common voltage V470 is at a high level 474. During time period T1, the first voltage difference VD3+ is lower than the second voltage difference VD4+. During time period T2, the first voltage difference VD3− is still lower than the second voltage difference VD4−. Thus, during both time periods T1 and T2, the first display field 310 has a lower transmittance than that of the second display field 320.

In some implementations, each extended portion of the common electrode can be configured to cover lower portions of a row of sub-pixels and upper portions of another row of sub-pixels. This way, the extended portions of the common electrodes can be made wider and have a smaller resistance, providing in a more uniform common voltage to an entire row of sub-pixels.

Figure 7A:
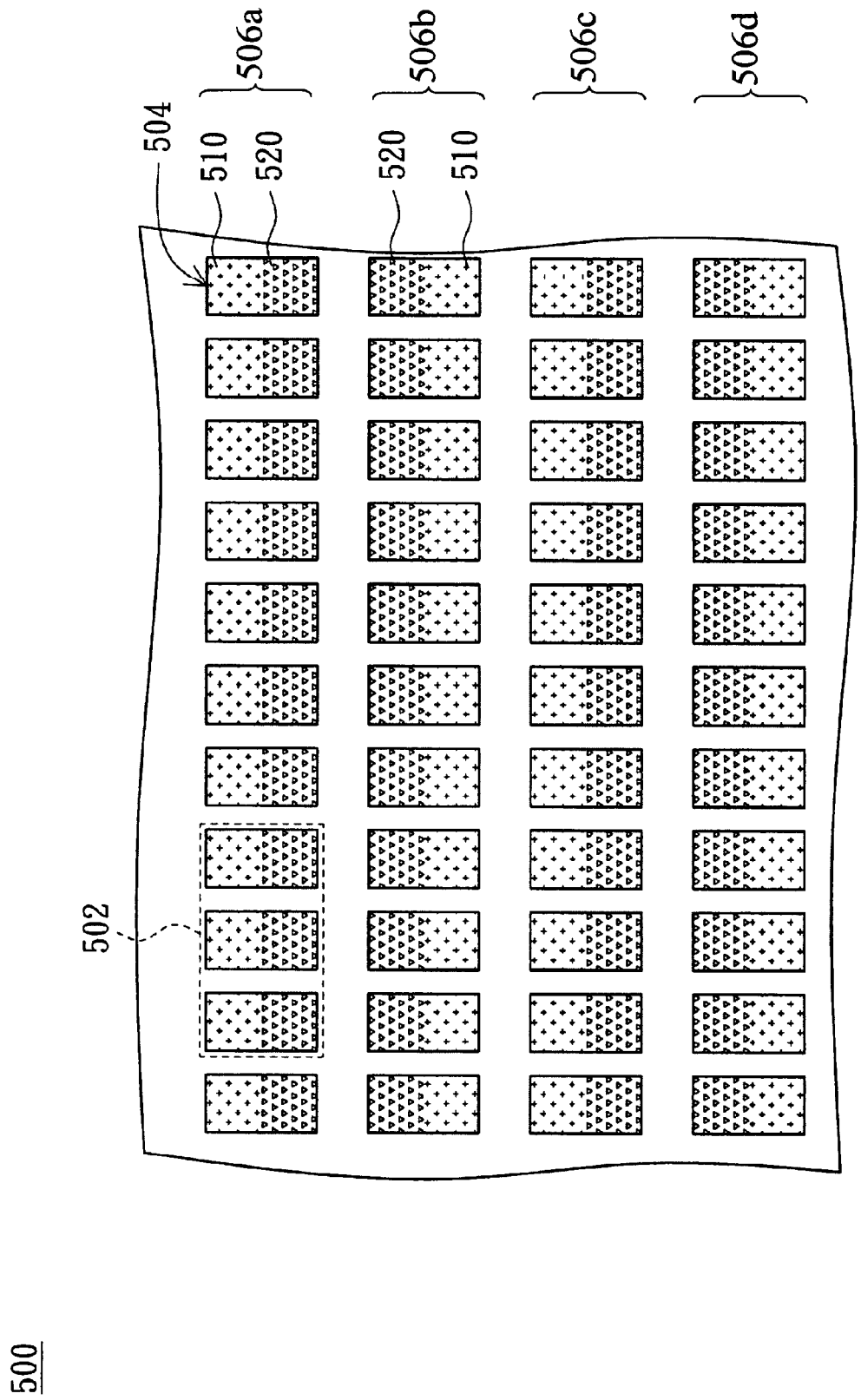
FIG. 7A is a top view of an array of sub-pixels of a display.

Referring to FIG. 7A, in an example of a liquid crystal display 500, a first row 506a of sub-pixels 504 have first display fields 510 that are located at upper portions of the sub-pixels 504 and second display fields 520 that are located at lower portions of the sub-pixels 504. A second row 506b of sub-pixels 504 have first display fields 510 that are located at lower portions of the sub-pixels 504 and second display fields 520 that are located at upper portions of the sub-pixels 504. A third row 506c of sub-pixels 504 have first display fields 510 that are located at upper portions of the sub-pixels 504 and second display fields 520 that are located at lower portions of the sub-pixels 504, and so forth. The first display fields 510 and the second display fields 520 can have different transmittances by using a first common electrode and a second common electrode that are connected to different voltages as described below.

Figures 7B, 7C:
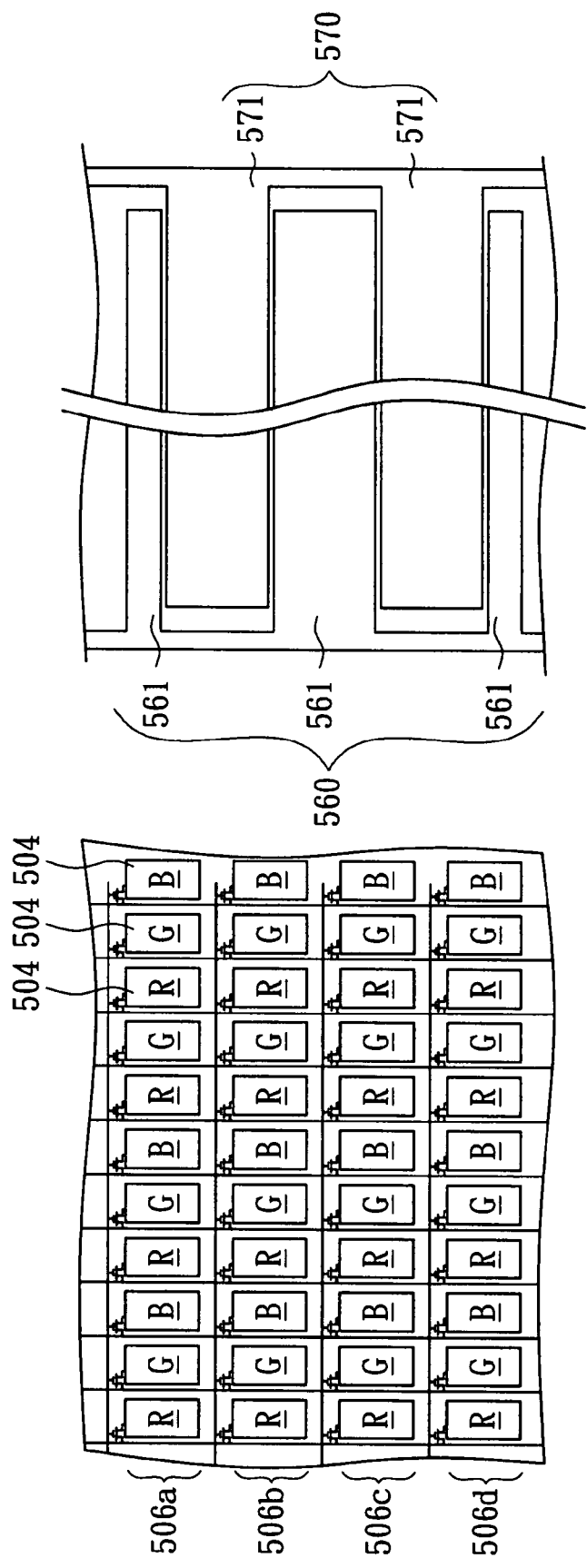
FIG. 7B is a schematic diagram of pixel electrodes of the display of FIG. 7A.
FIG. 7C is a schematic diagram of common electrodes of the display of FIG. 7A.

Referring to FIG. 7B, the display 500 includes an array of rows and columns of sub-pixels 504. Each sub-pixel 504 corresponds to one of the primary colors—red, green, and blue, shown on the display 500.

Referring to FIG. 7C, the display 500 includes a first common electrode 560 and a second common electrode 570. The first common electrode 560 includes extended portions 561. In this example, the uppermost extended portion 561 covers the upper halves of the first row 506a of sub-pixels. Except for the uppermost extended portion 561, each of the extended portions 561 covers the lower halves of even-numbered rows (e.g., 506b and 506d) of sub-pixels and the upper halves of odd-numbered rows (e.g., 506c) of sub-pixels. The second common electrode 570 includes extended portions 571. Each of the extended portions 571 covers the lower halves of the odd-numbered rows (e.g., 506a and 506c) of sub-pixels and the upper halves of even-numbered rows of sub-pixels.

In general, each extended portion of the first and second common electrodes 560 and 570 covers the lower halves of a row of sub-pixels and the upper halves of an adjacent row of sub-pixels. The extended portions at the top and bottom of the display cover the upper halves of the top row of sub-pixels and the lower halves of the bottom row of sub-pixels, respectively.

Each of the extended portions 561 and 571, as well as the extended portions 361 and 371 of FIG. 3G, extend across an entire row of sub-pixels. The extended portions 561 and 571 in FIG. 7C are generally wider than the extended portions 361 and 371 in FIG. 3G, and thus have smaller resistances, resulting in more uniform common voltages being provided to the display fields across the display 500.

A number of examples of displays have been described above. Other implementations and applications are also within the scope of the following claims. For example, a reflective type display can be used instead of a transmissive type display. In a reflective type display, a reflective layer is placed at the back side of the liquid crystal layer to reflect external light. Each sub-pixel is designed to have first and second display fields having characteristics that result in liquid crystal layers with slightly different transmittances. The first and second display fields can have different cell gaps or different common electrodes that connect to different common voltages. When external light rays pass through the liquid crystal layers of the first and second display fields and are reflected by the reflective layer, the first and second display fields show different luminance or brightness, while the overall luminance of the sub-pixel is close to an intended luminance. This reduces or eliminates color shift problems similar to the situation for transmissive type displays.

The arrangements of sub-pixels can be different from those described above, such as having RBG configuration instead of RGB, or having red, green, and blue sub-pixels aligned along the column direction instead of the row direction. A monochrome display can have pixels each having a first display field and a second display field, in which the liquid crystal layers of the first and second display fields have different transmittances. The difference in transmittance can be achieved by using different cell gaps or using two common electrodes coupled to different common voltages, as described above. Although monochrome displays do not have color shifting problems, using pixels having first and second display fields allows the display to maintain a consistent gray scale in the image across a wide range of viewing angles. The extended portions of the first and second common electrodes can extend in the column direction instead of the row direction. The voltage levels or timing sequence of the common voltages and pixel voltages can be different from those described above. Each pixel can have more than two display fields.

What is claimed is:

1. An apparatus comprising:
a liquid crystal display comprising sub-pixels each comprising a first display field and a second display field that either both operate in a transmissive mode or both operate in a reflective mode, the first and second display fields of a sub-pixel being driven by a same driving device, the first and second display fields of a sub-pixel having different characteristics that cause liquid crystal layers in the first and second display fields to have different transmittances,
wherein the first display field and the second display field of the same sub-pixel have different cell gaps, each sub-pixel comprises a color filter (CF) layer, the CF layer having a first portion covering the first display field and a second portion covering the second display field, the first portion having a first color layer, the second portion having a second color layer and a transparent layer, the transparent layer being between the second color layer and the liquid crystal layer such that the second portion of the CF layer has a thickness greater than that of the first portion of the CF layer, causing the cell gap corresponding to the second portion to be smaller than the cell gap corresponding to the first portion.

2. The apparatus of claim 1 wherein when a pixel voltage corresponding to a particular gray level is applied to the sub-pixel, the first display field shows a gray level darker than the particular gray level, the second display field shows a gray level lighter than the particular gray level, and overall the sub-pixel appears to show the particular gray level.

3. The apparatus of claim 1 wherein each sub-pixel corresponds to a primary color shown on the display and, when the same pixel voltage is applied to a group of sub-pixels that correspond to the same primary color, the first display fields of the group of sub-pixels have substantially the same transmittance.

4. The apparatus of claim 1 wherein each sub-pixel corresponds to a primary color shown on the display and, when the same pixel voltage is applied to various sub-pixels that correspond to different primary colors, the first display fields of the sub-pixels have different transmittances.

5. The apparatus of claim 1 wherein the driving device comprises a thin film transistor.

6. The apparatus of claim 1 wherein the sub-pixels are oriented such that the position of the first display field relative the corresponding second display field is the same for a row of sub-pixels.

7. The apparatus of claim 1 wherein the sub-pixels are oriented such that, within a row of sub-pixels, the position of the first display field relative the corresponding second display field alternates from one sub-pixel to the next sub-pixel.

8. The apparatus of claim 1 wherein each sub-pixel corresponds to a primary color shown on the display, and the first display fields that correspond to the same primary color have substantially the same cell gap.

9. The apparatus of claim 1 wherein each sub-pixel corresponds to a primary color shown on the display, each sub-pixel comprises a color filter (CF) layer, and portions of the CF layers covering the first display fields of a group of sub-pixels associated with the same primary color have substantially the same thickness.

10. The apparatus of claim 1 wherein each sub-pixel corresponds to a primary color shown on the display, and the first display fields of various sub-pixels that correspond to different primary colors have different cell gaps.

11. The apparatus of claim 1 wherein each sub-pixel corresponds to a primary color shown on the display, each sub-pixel comprises a color filter (CF) layer, and portions of the CF layers covering the first display fields of various sub-pixels associated with different primary colors have different thicknesses.

12. The apparatus of claim 1 wherein each sub-pixel comprises a first common electrode that corresponds to the first display field and a second common electrode that corresponds to the second display field, the first common electrode to connect to a first common voltage, the second common electrode to connect to a second common voltage that is different from the first common voltage.

13. The apparatus of claim 12 wherein each sub-pixel corresponds to a primary color shown on the display, and the first display fields of sub-pixels corresponding to the same primary color are associated with the same common electrode.

14. The apparatus of claim 12 wherein the first common electrode is coupled to a first direct-current voltage and the second common electrode is coupled to a second direct-current voltage.

15. The apparatus of claim 12 wherein the first common electrode is coupled to a first alternating-current common voltage and the second common electrode is coupled to a second alternating-current common voltage.

16. The apparatus of claim 15 wherein the pixel electrode is coupled with an alternating-current pixel voltage, the frequency of the pixel voltage, the first common voltage and the second common voltage are substantially the same, and the average value of the pixel voltage, the average value of the first common voltage, and the average value of the second common voltage are substantially the same.

17. The apparatus of claim 15 wherein the polarity of the first alternating-current common voltage is opposite to that of the second alternating-current common voltage.

18. The apparatus of claim 12 wherein the first common electrode comprises a plurality of first extending portions, the second common electrode comprises a plurality of second extending portions, the first extending portions and the second extending portions being disposed alternately along a direction.

19. The apparatus of claim 18 wherein each of some first extending portions corresponds to two rows of the sub-pixels and each of some of the second extending portions correspond to two rows of the sub-pixels.

20. An apparatus comprising: a liquid crystal display comprising sub-pixels each comprising a first display field and a second display field, the first and second display fields both being driven by a same driving device, the first and second display fields having characteristics such that when a pixel voltage corresponding to a particular gray level is applied to the sub-pixel, the first display field shows a gray level darker than the particular gray level, the second display field shows a gray level lighter than the particular gray level, and overall the sub-pixel appears to show the particular gray level wherein the first display field and the second display field of the same sub-pixel have different cell gaps, each sub-pixel comprises a color filter (CF) layer, the CF layer having a first portion covering the first display field and a second portion covering the second display field, the first portion having a first color layer, the second portion having a second color layer and a transparent layer, the transparent layer being between the second color layer and the liquid crystal layer such that the second portion of the CF layer has a thickness greater than that of the first portion of the CF layer, causing the cell gap corresponding to the second portion to be smaller than the cell gap corresponding to the first portion.

21. A method comprising:

driving a first display field and a second display field of a sub-pixel of a liquid crystal display using a driving device, the first and second display fields having characteristics such that when a pixel voltage corresponding to a particular gray level is applied to the sub-pixel, the first display field shows a gray level darker than the particular gray level, the second display field shows a gray level lighter than the particular gray level, and overall the sub-pixel appears to show the particular gray level~ wherein the first display field and the second display field of the same sub-pixel have different cell gaps, each sub-pixel comprises a color filter (CF) layer, the CF layer having a first portion covering the first display field and a second portion covering the second display field, the first portion having a first color layer, the second portion having a second color layer and a transparent layer, the transparent layer being between the second color layer and the liquid crystal layer such that the second portion of the CF layer has a thickness greater than that of the first portion of the CF layer, causing the cell gap corresponding to the second portion to be smaller than the cell gap corresponding to the first portion.

* * * * *